P. Plant,
Lamp Burner,
No. 2,974, Reissued June 9, 1868.
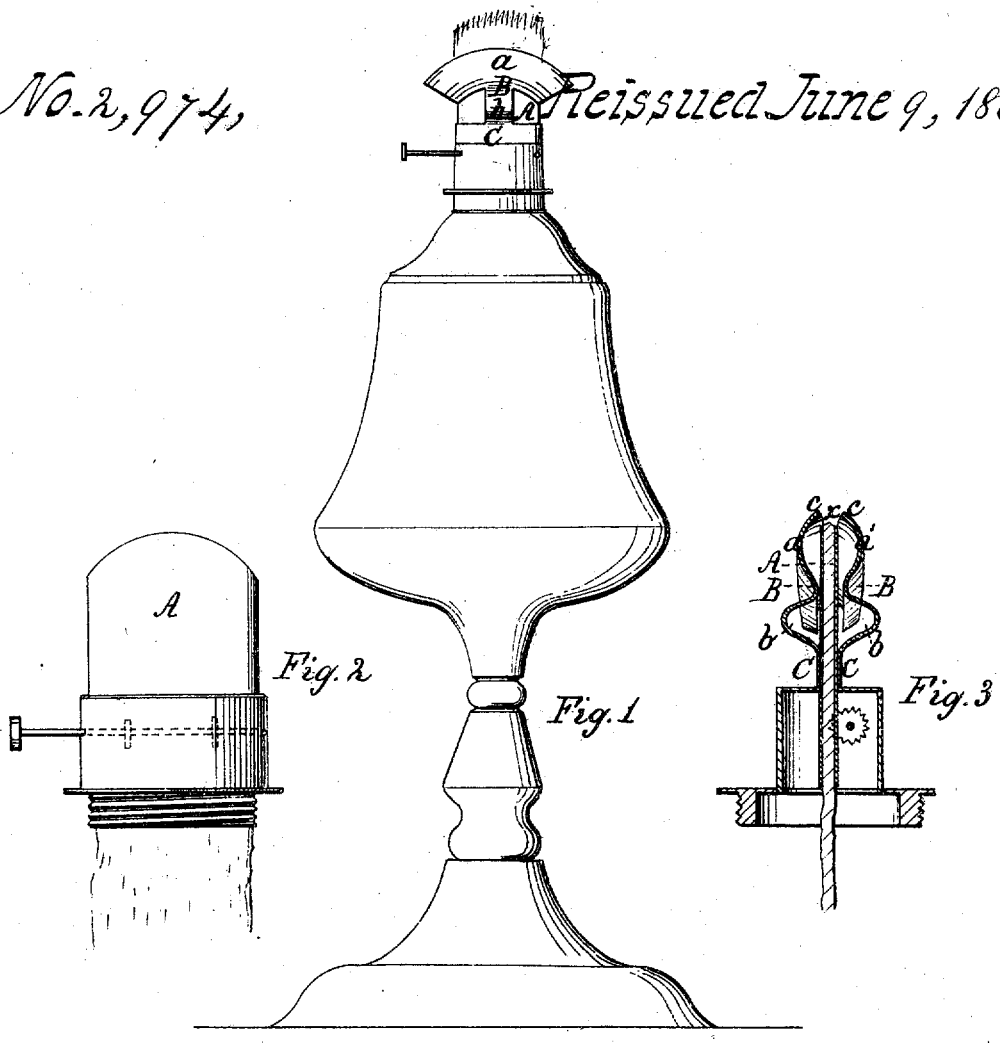
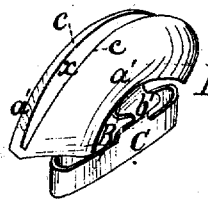
Witnesses
C. Jacobs.
John P Jacobs
Inventor
P. Plant
by A R Ely

P. Plant,
Lamp Burner,
No. 2,974, Reissued June 9, 1868
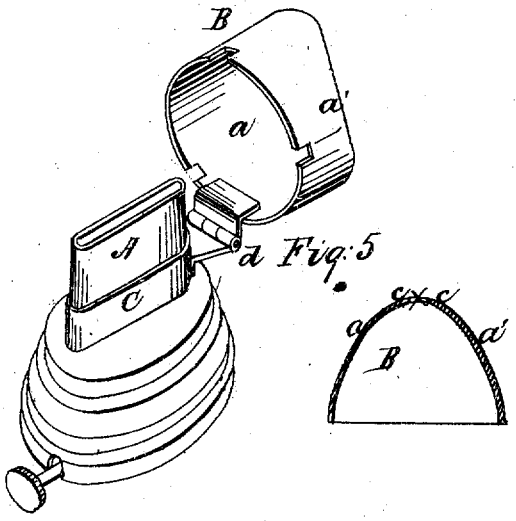
Witnesses
C. Jacobs
John P Jacobs
Inventor
P. Plant
by A R Eddy

United States Patent Office.

P. HANNAY, OF WASHINGTON, DISTRICT OF COLUMBIA, AND HUDSON TAYLOR, OF POUGHKEEPSIE, NEW YORK, ASSIGNEES, BY MESNE ASSIGNMENTS, OF PASCAL PLANT, OF WASHINGTON, DISTRICT OF COLUMBIA, ASSIGNORS TO HUDSON TAYLOR, TRUSTEE.

*Letters Patent No.* 19,896, *dated April* 6, 1858; *reissue No.* 2,974, *dated June* 9, 1868.

DIVISION B.

IMPROVEMENT IN LAMPS.

The Schedule referred to in these Letters Patent and making part of the same.

Be it known that I, PASCAL PLANT, of Washington, in the District of Columbia, have invented a new and useful Improvement in Lamps, of which the following is a full description, with the accompanying drawings.

Figure 1 is a perspective view of the lamp, with improvement.

Figure 2 is a side elevation of wick-tube, cap-piece removed.

Figure 3 is a transverse section, vertical, through wick-tube and cap-piece.

Figure 4 is a perspective view of cap-piece, secured to the slide by arms.

Figure 5 is a perspective view of a cap-piece, hinged to the slide at the end.

My invention relates principally to that class of lamps fed by volatile or other oils having a high equivalent of carbon, (hydrocarbon.)

Great difficulty has been experienced in bringing those kinds of oil into general use, because of their excess of carbon, which, as it requires a much larger amount of oxygen for its combustion than can be supplied from the air immediately surrounding the flame, allows a great portion of the gas engendered to escape in an unconsumed condition in smoke or soot, a perfect combustion not having been attained. To remedy this, it has been found necessary to use a chimney for creating an artificial draught, or bringing a larger amount of air in contact with the flame for the consumption of the free carbon, and the purposes of a more perfect combustion; but such an arrangement renders the lamp costly, liable to breakage, and unfit to be carried about.

The nature of my invention consists in forcing through the lower part of the flame a current of fresh air, so that the oxygen therein contained shall be brought immediately in contact with the carbon as soon as the temperature is high enough to promote combustion; to effect which, I provide the lamp with a cap-piece, of such construction and arrangement that the entire carbon may be essentially consumed, as it is evolved, without the aid of a chimney. And further, in so attaching the cap-piece to the lamp or wick-tube by a hinge that it may be readily turned back from the wick, for trimming, without removal, while it is made adjustable as to its height with the wick-tube.

In the accompanying drawings, the upper part of the wick-tube A is enclosed by a cap-piece, B, with two sides, *a a'*, properly formed and shaped in reference to the wick-tube, and so arranged as to form an arched dome, as it were, over the wick-tube, having a slot at the top and open at the bottom. C is a slide, which fits over the wick-tube, to which the cap-piece B is fastened, by means of arms *b*, fig. 4.

The lips *c*, or upper ends of the sides *a a'*, are curved or inclined towards each other, but not meeting, thus forming a slot, *x*, corresponding essentially to the upper end of the wick-tube, the boundary lines or lips *c* of the slot *x* being so arranged that when the cap-piece is adjusted they shall be essentially in a line parallel with the sides of the wick-tube, so that when the lamp is lighted the under or blue part of the flame shall burn in the slot *x*, and spread to or nearly to the edge of the lips *c*, thus forcing or causing the body of the air to pass through the flame instead of simply impinging on its sides, for as the air confined in the under side of the cap-piece B (which for this purpose is curved or set at an angle to the top of the wick-tube A, so as to form an air-chamber, and to deflect the air to the flame) is heated and rises, there being only a small space at the top, through which it can pass, and that essentially through the flame, a sufficient current will be induced to supply the requisite amount of oxygen for the complete combustion of the carbon. The form and size of the slot *x* of the cap-piece B, and its elevation over the wick-tube A, will depend mainly upon the size and form of the upper end of the wick-tube, to which it can be readily adapted, its height being adjusted on the tube, or, if stationary, the wick being regulated to conform to its position. Where the lips are detached from each other, they may be corrugated, and may be made to approach to or recede from each other by an adjusting-screw, or by compressing or opening the arms, or in any suitable manner.

It may be remarked that a glass chimney or globe may be used, if deemed desirable.

The cap-piece, instead of being secured to the slide by arms *b*, may be hinged to the slide, as at *d*, and thus be thrown back from the flame for the purpose of reaching the wick and trimming the lamp with facility.

From the foregoing it will be readily perceived that the form of my cap-piece, and the manner of attaching or securing it to the lamp, may be modified so long as it is so constructed and arranged in relation to the wick-tube and wick that the body of the current of air shall pass through the flame, and the flame burn in and essentially fill the space of the slot.

What I claim, is—

1. Combining a cap-piece or burner substantially as and for the purposes set forth, with the wick-tube or top of a hydrocarbon-lamp, so that the burner may be thrown back from the wick-tube, substantially as and for the purposes described.

2. The combination of a hinged cap-piece or burner with the means of adjusting the same relatively to the wick-tube, substantially as described.

3. A hinged burner or cap-piece for a hydrocarbon-lamp, when constructed and arranged with reference to the wick-tube, wick, or flame, and the admission of air, substantially as described.

Witness my hand to the above specification.

PASCAL PLANT.

Witnesses:

A. B. ELY,

V. HORNBACH.